United States Patent
Saifullah et al.

(10) Patent No.: US 7,565,144 B2
(45) Date of Patent: Jul. 21, 2009

(54) METHOD, SYSTEM AND MOBILE STATION FOR HANDING OFF COMMUNICATIONS FROM A CELLULAR RADIO ACCESS NETWORK TO AN UNLICENSED MOBILE ACCESS NETWORK

(75) Inventors: Yousuf Saifullah, Flower Mound, TX (US); Haihong Zheng, Coppell, TX (US)

(73) Assignee: Nokia Corporation, Espoo (FI)

( * ) Notice: Subject to any disclaimer, the term of this patent is extended or adjusted under 35 U.S.C. 154(b) by 64 days.

(21) Appl. No.: 10/979,009

(22) Filed: Nov. 1, 2004

(65) Prior Publication Data

US 2006/0094431 A1 May 4, 2006

(51) Int. Cl.
H04W 40/00 (2009.01)
H04W 4/00 (2009.01)
(52) U.S. Cl. .................. 455/436; 455/448; 370/331
(58) Field of Classification Search .............. None
See application file for complete search history.

(56) References Cited

U.S. PATENT DOCUMENTS

| | | | | |
|---|---|---|---|---|
| 6,795,689 B1 * | 9/2004 | Ogren et al. | ............. | 455/67.13 |
| 2002/0147008 A1 | 10/2002 | Kallio | | |
| 2003/0078037 A1 * | 4/2003 | Auckland et al. | ........... | 455/422 |
| 2003/0115261 A1 * | 6/2003 | Mohammed | ................ | 709/203 |
| 2004/0008645 A1 * | 1/2004 | Janevski et al. | ............. | 370/331 |
| 2004/0097230 A1 * | 5/2004 | Natarajan et al. | ........... | 455/436 |
| 2004/0106430 A1 * | 6/2004 | Schwarz et al. | .......... | 455/552.1 |
| 2004/0146021 A1 * | 7/2004 | Fors et al. | ................... | 370/331 |
| 2004/0264410 A1 * | 12/2004 | Sagi et al. | ................... | 370/331 |
| 2005/0070288 A1 * | 3/2005 | Belkin et al. | ................ | 455/439 |
| 2005/0147068 A1 * | 7/2005 | Rajkotia | ..................... | 370/338 |
| 2005/0153736 A1 * | 7/2005 | Ganton | ..................... | 455/553.1 |

OTHER PUBLICATIONS

International Search Report for PCT/IB2005/003241, dated Apr. 5, 2006.
UMA User Perspective (Stage 1) R1.0.0 (Sep. 1, 2004), Technical Specification, *Unlicensed Mobile Access (UMA); User Perspective (Stage 1)*; © 2004, ALCATEL, AT&T Wireless Services, Inc., BT PLC, Cingular Wireless LLC, Ericsson AB, Kineto Wireless Inc., Motorola, Inc., Nokia, Nortel Networks, Inc., O2, Rogers Wireless Inc., Siemens AG, Sony Ericsson, T-Mobile USA.
UMA Architecture (Stage 2) R1.0.1 (Oct. 8, 2004), Technical Specification, *Unlicensed Mobile Access (UMA); Architecture (Stage 2)*; © 2004, ALCATEL, AT&T Wireless Services, Inc., BT PLC, Cingular Wireless LLC, Ericsson AB, Kineto Wireless Inc., Motorola, Inc., Nokia, Nortel Networks, Inc., O2, Rogers Wireless Inc., Siemens AG, Sony Ericsson, T-Mobile USA.

\* cited by examiner

*Primary Examiner*—Nick Corsaro
*Assistant Examiner*—Joel Ajayi
(74) *Attorney, Agent, or Firm*—Alston & Bird, LLP

(57) ABSTRACT

A method, system and mobile station for handing off communications from a cellular radio access network, such as a code division multiple access (CDMA) radio access network, to an unlicensed mobile access network (UMAN) are provided. The handoff may be effected by a signaling sequence between the mobile station, an unlicensed network controller of the UMAN, a base station controller of the cellular radio access network and the core network. In this signaling sequence, the UMAN may be identified in various manners, such as by means of an otherwise unassigned pilot PN offset or by means of a band class and an invalid frequency.

8 Claims, 5 Drawing Sheets

METHOD, SYSTEM AND MOBILE STATION FOR HANDING OFF COMMUNICATIONS FROM A CELLULAR RADIO ACCESS NETWORK TO AN UNLICENSED MOBILE ACCESS NETWORK

FIELD OF THE INVENTION

The present invention relates generally to handing off communications in a seamless manner between different types of networks and, more particularly, to methods, systems and mobile stations for handing off communications from a cellular radio access network to an unlicensed mobile access network.

BACKGROUND OF THE INVENTION

Unlicensed mobile access networks (UMANs) have been developed that provide numerous advantages relative to conventional cellular radio access networks. For example, a UMAN may be faster in some situations than conventional cellular radio access networks and/or may be less expensive to utilize than some conventional cellular radio access networks. Thus, it is advantageous in at least some situations to access a core network via a UMAN as opposed to a more conventional cellular radio access network.

A UMAN generally includes an access point, such as a transceiver, for communicating with a mobile station in an unlicensed spectrum, such as by means of Bluetooth™ brand wireless access technology developed by the Bluetooth Special Interest Group, wireless local area network (WLAN) techniques such as IEEE 802.11, WiMAX techniques such as IEEE 802.16 or the like. The access point of the UMAN is connected to a unlicensed network controller via a broadband IP access network. The unlicensed network controller, in turn, supports communication with the core network such that the mobile station can communicate with the core network ostensibly in the same manner from the user's perspective as if the communications were supported by a conventional cellular radio access network.

In use, a mobile station involved in a communication session supported by a cellular radio access network may transition to a location supported by a UMAN. In this scenario, the communication session is desirably handed off from the cellular radio access network to the UMAN in a seamless manner such that subsequent communications are supported by the UMAN, at least up until the mobile station moves to a location outside of the coverage area of the UMAN.

In order to provide access to GSM (Global System for Mobile communications) and/or GPRS (General Packet Radio Services) services via a UMAN, a technical specification for the unlicensed mobile access (UMA) technology has been developed. See the UMA Architecture (Stage 2) R 1.0.1 technical specification dated Oct. 8, 2004 (hereinafter the "UMA architecture specification"). The UMA architecture specification defines the manner in which a communication session is handed off from a GSM/GPRS radio access network to a UMAN. See Section 9.10 of the UMA architecture specification. Assuming that the mobile station is configured so as to prefer communications via a UMAN as opposed to a GSM/GPRS radio access network and further assuming that the mobile station has detected and successfully registered with a UMAN, the mobile station, the base station controller of the GSM/GPRS radio access network, the unlicensed network controller and the core network conduct a predefined signaling sequence in order to successfully handoff the communication session from the cellular radio access network to the UMAN.

In this regard, the UMAN is assigned an absolute radio frequency channel number (ARFCN) and a base station identity code (BSIC) for identification purposes within the GSM/GPRS network, and the base station controller is provided not only with the ARFCN and BSIC of the UMAN, but also an association between the ARFCN and BSIC of the UMAN and the cell global identification (CGI) of the UMAN. Thereafter, upon the detection of a UMAN, the mobile station initially provides a measurement report to the base station controller that reports the highest signal level for the UMAN which is identified by its ARFCN and the BSIC. The base station controller identifies the CGI of the UMAN upon recognizing that the highest signal level is associated with another network, in this instance, the UMAN. The base station controller then initiates the signaling sequence required to hand over communications from the GSM/GPRS radio access network to the UMAN. Once the handover is complete, the mobile station can communicate with the core network via the UMAN, oftentimes in a faster and less expensive fashion than similar communications via a GSM/GPRS radio access network.

Unfortunately, the UMA architecture specification only provides for handoff from a GSM/GPRS radio access network to a UMAN and does not support the handoff of a communication session from other types of cellular radio access networks to a UMAN. In this regard, the ARFCN and BSIC that are utilized to identify the UMAN are specific to GSM/GPRS technology and are not utilized in conjunction with other types of cellular networks, such as code division multiple access (CDMA) networks.

For UMANs to further gain in popularity and acceptance, it would be desirable to facilitate the handover of communication sessions from various types of cellular radio access networks, including CDMA radio access networks, such that a mobile station may travel more freely between radio access networks without concern that the communication session will be interrupted and while permitting the mobile station to take advantage of communication via UMANs that are available even if the mobile station was previously supported by a cellular radio access network other than a GSM/GPRS radio access network, such as a CDMA radio access network.

SUMMARY OF THE INVENTION

A method, system and mobile station for handing off communications from a code division multiple access (CDMA) radio access network, to an unlicensed mobile access network (UMAN) are provided. As such, a mobile station can move from a cellular radio access network, such as a CDMA radio access network, to a UMAN and thereafter be supported by the UMAN without interrupting the communication session of the mobile station. Thus, the mobile station can leverage the advantages provided by a UMAN, such as in terms of speed and cost, without interrupting ongoing communication sessions previously supported by a cellular radio access network.

According to one aspect of the present invention, the mobile station initially registers with the UMAN. The UMAN includes an unlicensed network controller that is identified to the mobile station as part of the registration process. In order to effect a handoff to the UMAN, a message is transmitted from the mobile station to the cellular radio access network, such as a CDMA radio access network, directing the handoff of communications from the cellular radio access network to the UMAN. The cellular radio access network generally includes a base station controller for supporting communications with the mobile station and, in this instance, for receiving the message from the mobile station and directing the handoff of communications to the UMAN. As a result of cooperation between the unlicensed network controller and the base station controller, communications are subsequently handed off from the cellular radio access network, such as a CDMA radio access network, to the UMAN such that the mobile station is thereafter in communication with the unlicensed network controller of the UMAN.

The unlicensed network controller may be identified in several manners. In one advantageous embodiment, the unlicensed network controller is assigned a pilot pseudo noise (PN) offset. The pilot PN offset that is assigned to the unlicensed network controller is otherwise unassigned within the cellular network. The pilot PN offset that is assigned to the unlicensed network controller may be associated with a cell global identifier (CGI) of the unlicensed network controller. This association of the pilot PN offset assigned to the unlicensed network controller and its CGI is provided to the cellular radio access network and, more typically, to the base station controller. In order to direct the handoff of communication from the cellular network to the UMAN in accordance with this embodiment, the mobile station transmits a message to the cellular radio access network and, more typically, to the base station controller that assigns a greater pilot strength to the pilot PN offset assigned to the unlicensed network controller than to any other pilot PN offset. Based upon the pilot strength of the pilot PN offset assigned to the unlicensed network controller, the base station controller can determine that communications with the mobile station should be handed off and can identify the network to which communications are to be handed off as that network identified by the CGI associated with the pilot PN offset having the greatest pilot strength, i.e., the UMAN.

In accordance with another advantageous embodiment, the identification of the unlicensed network controller takes advantage of the predefined frequency ranges associated with the respective band classes. In this regard, the unlicensed network controller may be assigned a band class and a frequency outside of the frequency range of the respective band class, i.e., an invalid frequency. The combination of the band class and the frequency assigned to the unlicensed network controller can then be utilized to identify the unlicensed network controller. Since the frequency assigned to the unlicensed network controller is invalid for the respective band class, one can be assured that the band class and the frequency assigned to the unlicensed network controller are not otherwise utilized by the cellular network. In order to direct the handoff of the communications from the cellular radio access network to the UMAN, the mobile station transmits respective pilot strengths for a plurality of pilot PN offsets with all of the pilot strengths being less than a predefined value. In this regard, all of the pilot strengths may be set equal to zero or may be set equal to the same small value. The cellular radio access network and, more typically, the base station controller of the cellular radio access network receives the pilot strengths transmitted by the mobile station and recognizes the uniformly small pilot strengths to be indicative of a request to hand off communications to a UMAN. A message indicating the frequency assigned to the unlicensed network controller is then transmitted from the cellular radio access network and, more typically, from the base station controller to the mobile station. Following a predefined signaling sequence, communications may be effectively handed off to the UMAN.

Regardless of the manner in which the unlicensed network controller is identified, the method of the present invention reliably effects handoff of communications from a cellular radio access network, such as a CDMA radio access network, to a UMAN. Correspondingly, a system including an unlicensed network controller of a UMAN and a base station controller of a cellular radio access network, such as a CDMA radio access network, is provided for handing off communications with a mobile station from the cellular radio access network to the UMAN. Further, a dual mode mobile station is provided for alternately communicating via a cellular radio access network, such as a CDMA radio access network, and a UMAN with the mobile station including memory for storing the identification of the unlicensed network controller of the UMAN and a controller for registering the mobile station with the UMAN and for thereafter transmitting a message to the cellular radio access network to direct the handoff of communications from the cellular radio access network to the UMAN and for supporting the subsequent signaling sequence necessary to effect the handoff. Accordingly, the method, system and mobile station of the present invention facilitate the handoff of communications with a mobile station from a cellular radio access network, such as a CDMA radio access network, to a UMAN, thereby facilitating the transition of the mobile station between networks while leveraging the advantages provided by UMAN where possible.

BRIEF DESCRIPTION OF THE DRAWINGS

Figure 1:
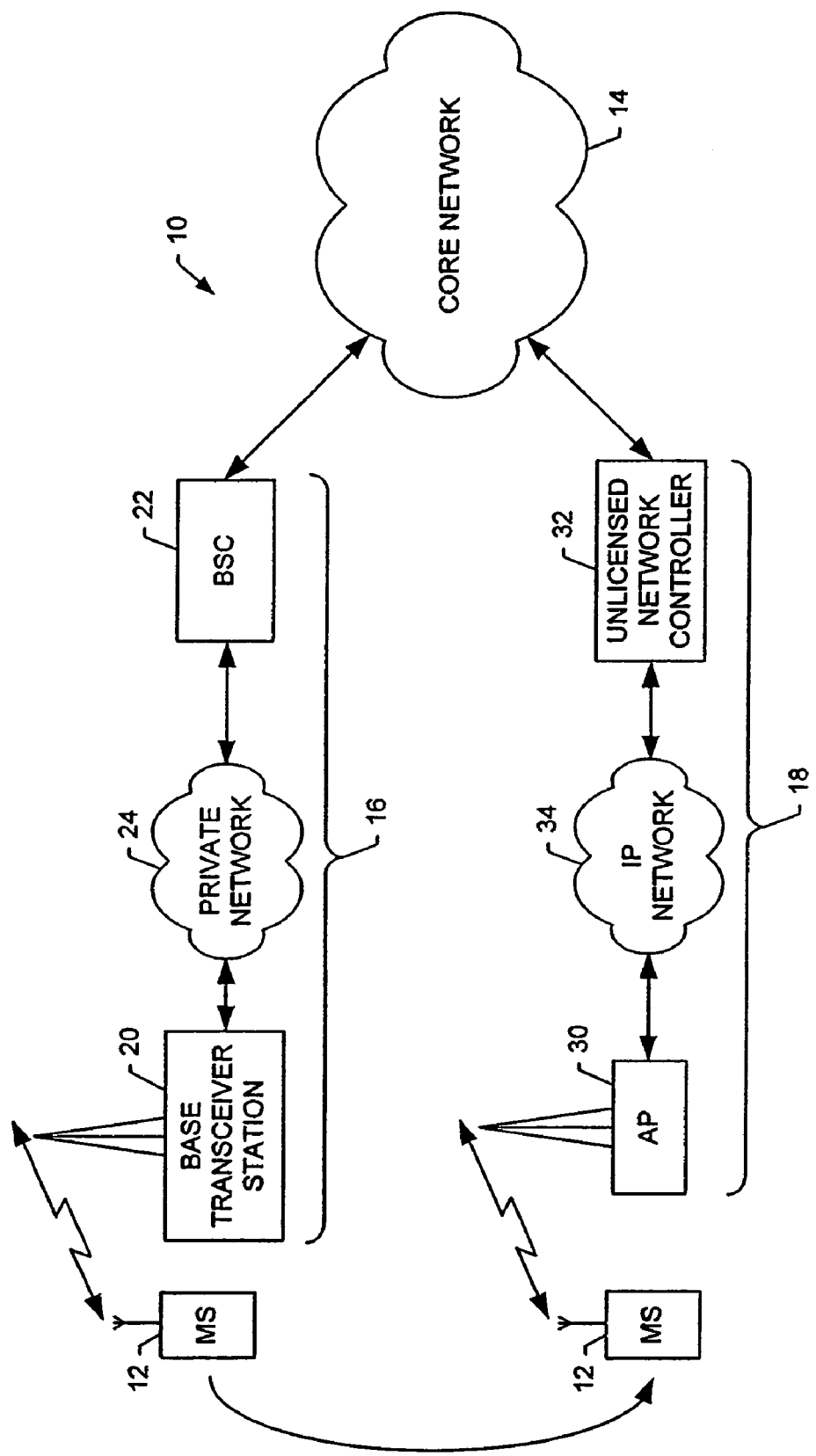
Figure 2:
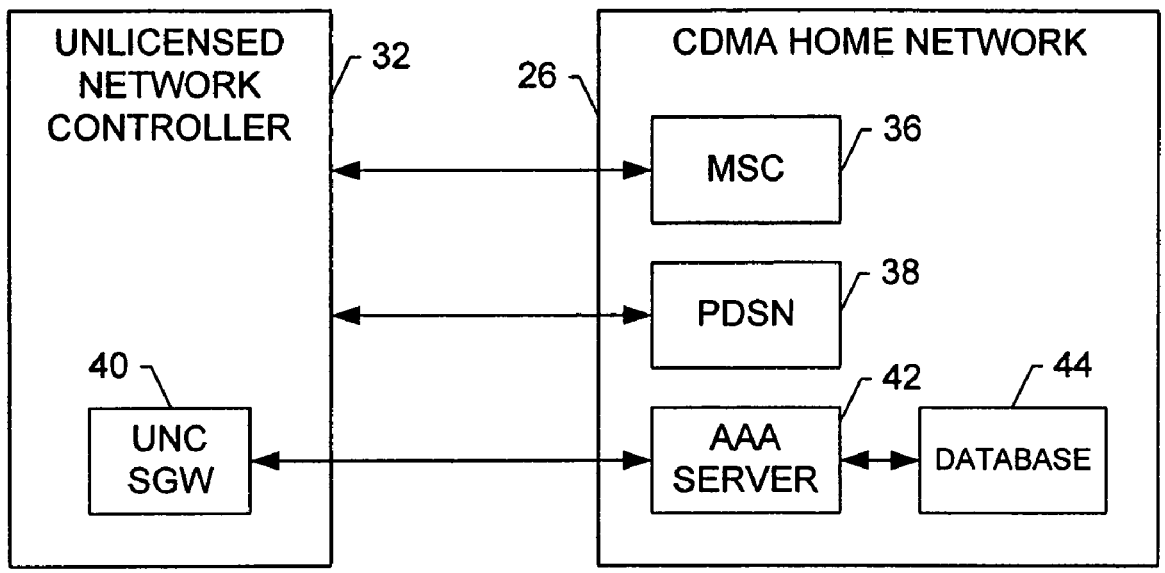
Figure 3:
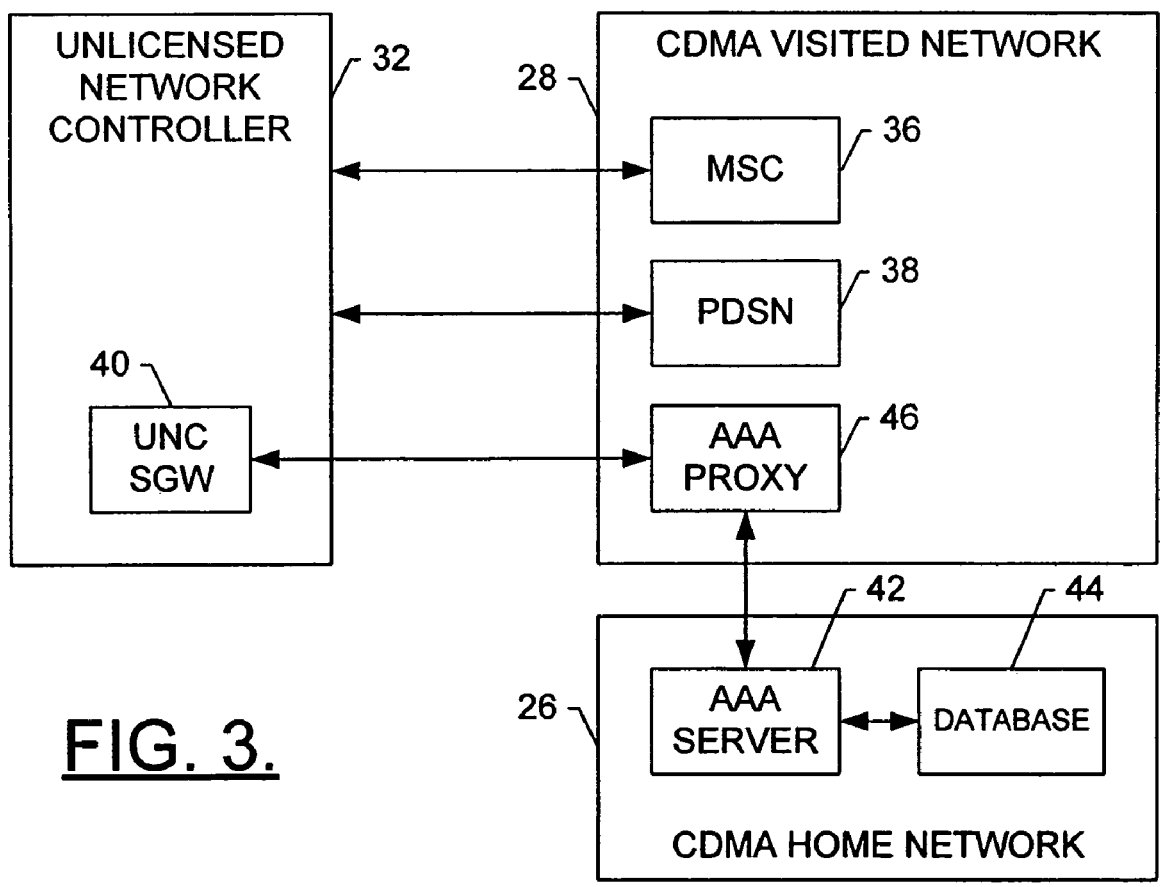
Figure 4:
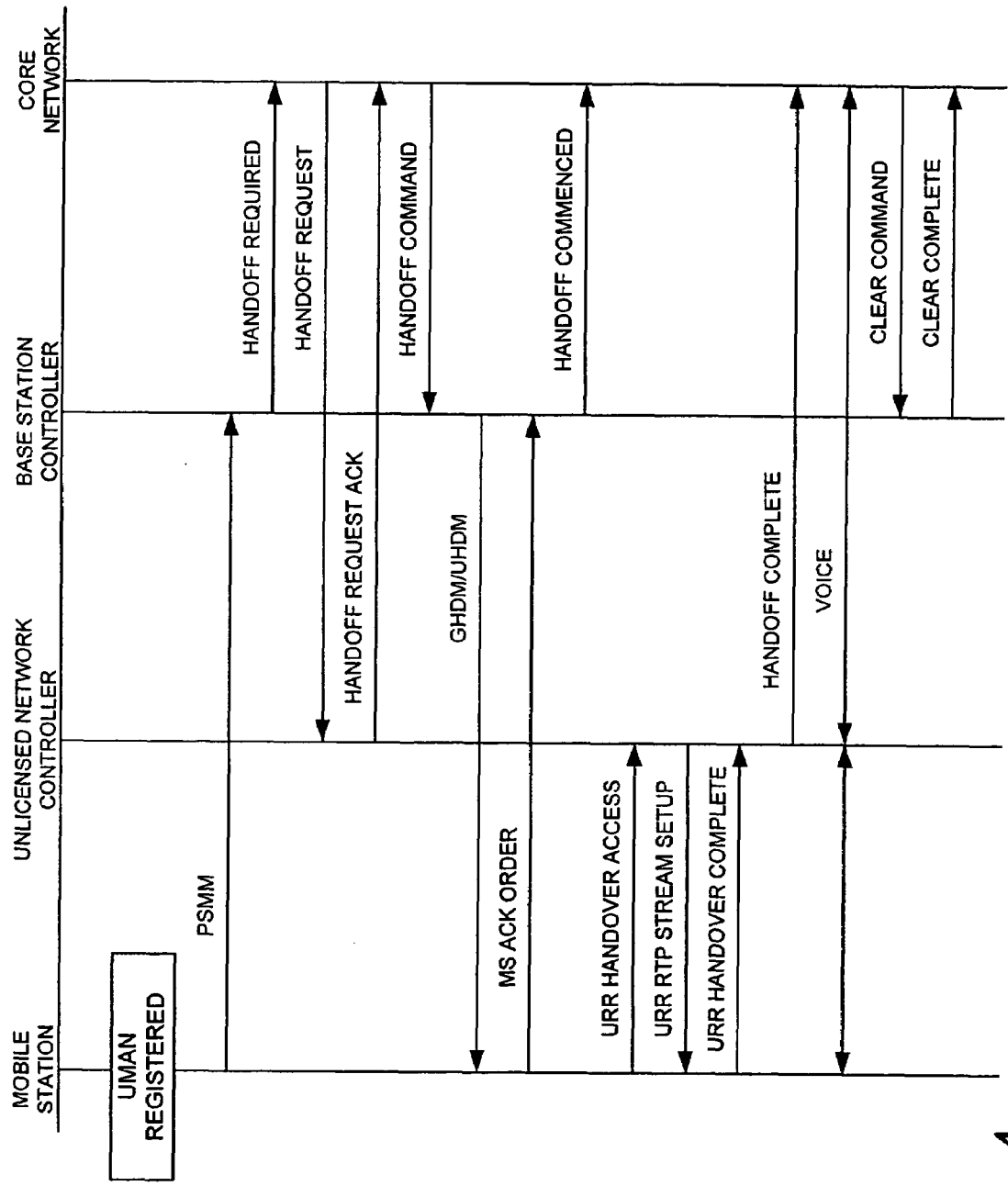
Figure 5:
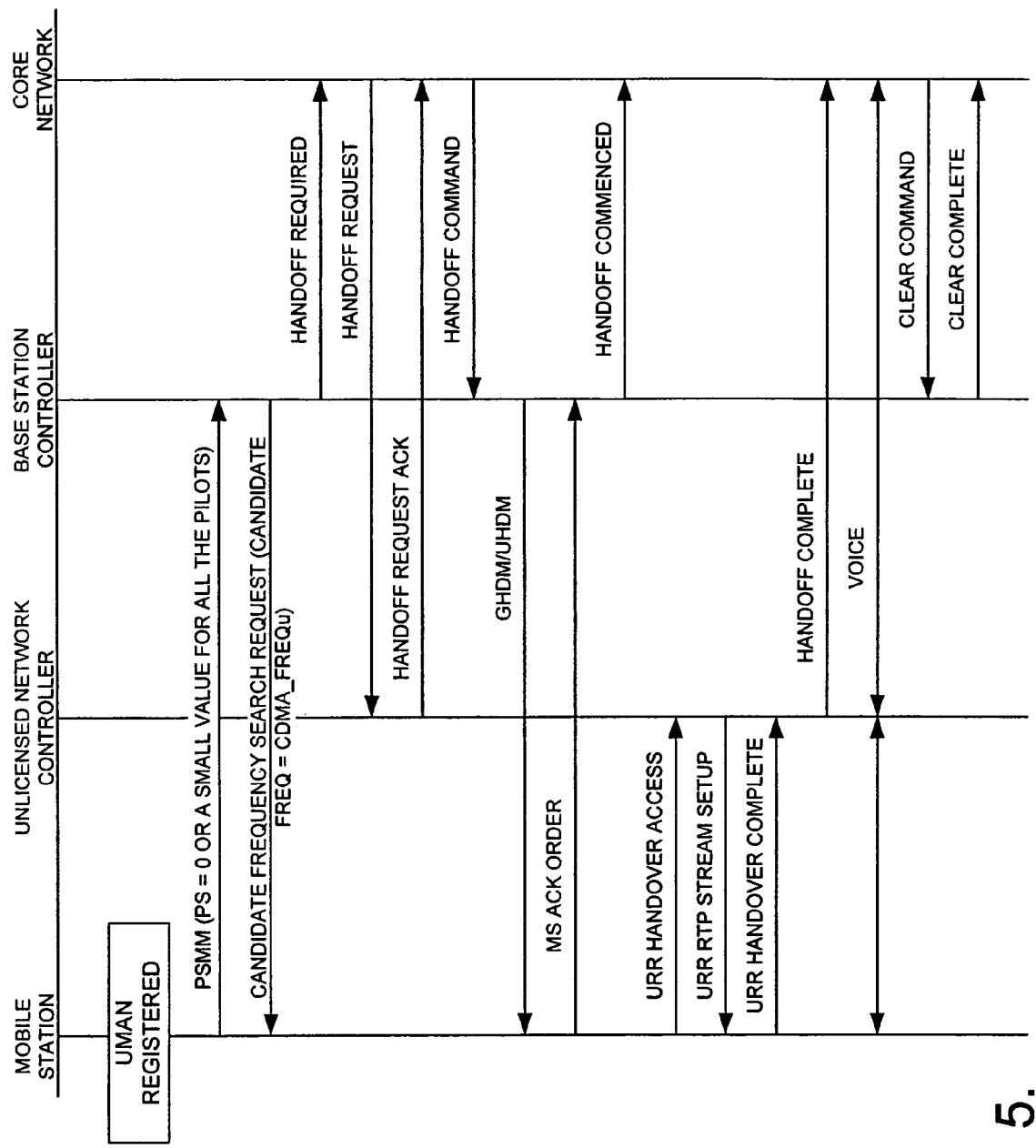
Figure 6:
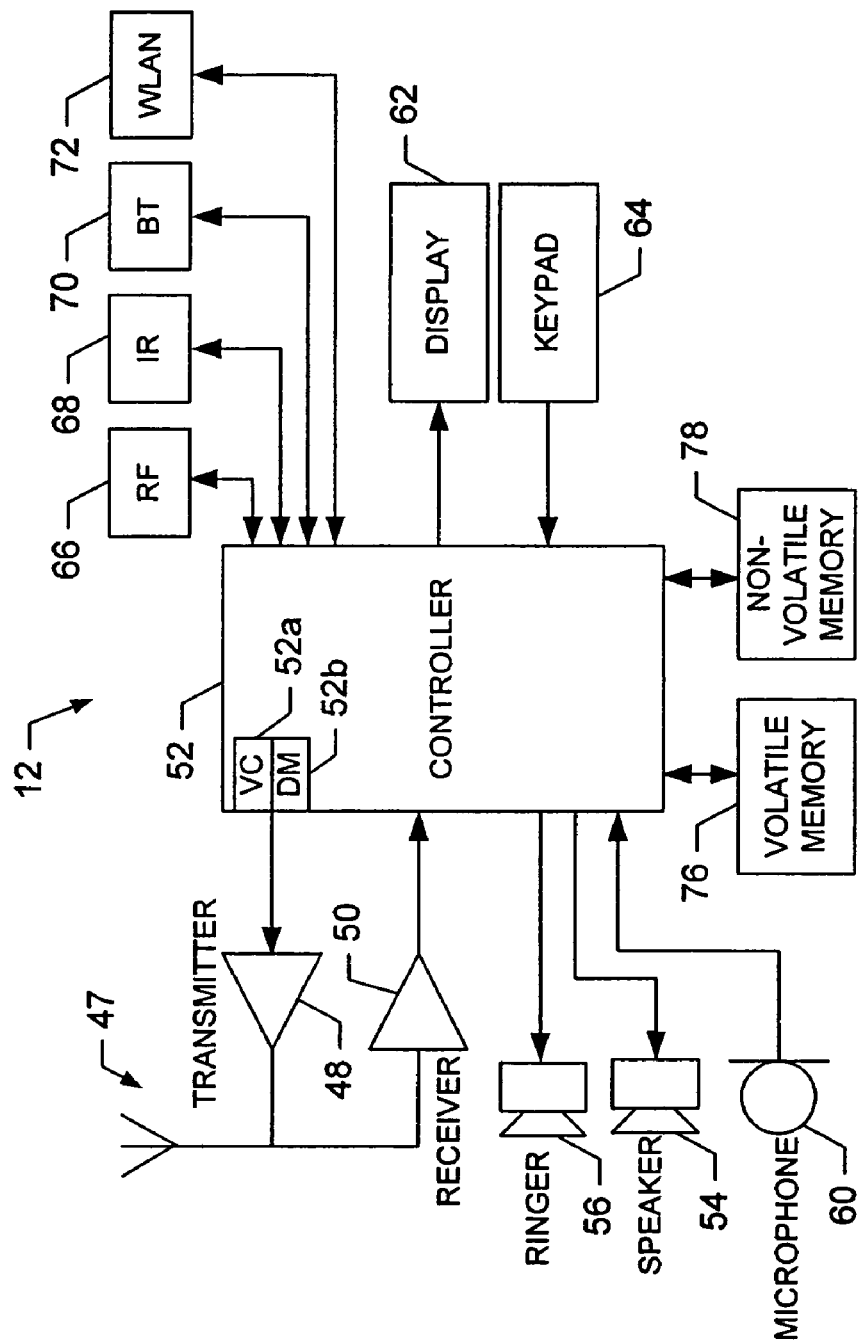

Having thus described the invention in general terms, reference will now be made to the accompanying drawings, which are not necessarily drawn to scale, and wherein:

FIG. 1 is a block diagram of a system in accordance with one embodiment of the present invention;

FIG. 2 is a block diagram illustrating communications between an unlicensed network controller and a home network in accordance with one embodiment of the present invention;

FIG. 3 is a block diagram illustrating communications between an unlicensed network controller and visited and home networks in accordance with another embodiment of the present invention;

FIG. 4 depicts a signaling sequence for handing off communications from a cellular radio access network, such as a CDMA radio access network, to an unlicensed mobile access network (UMAN) in accordance with one embodiment of the present invention;

FIG. 5 depicts a signaling sequence for handing off communications from a cellular radio access network, such as a CDMA radio access network, to a UMAN in accordance with another embodiment of the present invention; and FIG. 6 is a block diagram of a mobile station in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of system 10 that would benefit from embodiments of the present invention is provided. The system, method and mobile station 12 of embodiments of the present invention will be primarily described in conjunction with mobile communications applications. In this regard, a mobile station is capable of communicating with a core network 14 via either a cellular radio access network, such as a code division multiple access (CDMA) radio access network 16, or an unlicensed mobile access network (UMAN) 18. While the mobile station may be a mobile telephone, the mobile station may be comprised of other types of wireless end node devices including, for example, pagers, portable data assistants (PDAs), handheld data terminals, laptop computers and other portable electronic devices. Regardless of its configuration, the mobile station is advantageously capable of operating in at least two modes so as to transmit and receive in a cellular radio mode, such as CDMA mode, and in a UMAN mode. A mobile station capable of operating in two modes is referred to as a dual mode mobile station, such as a dual mode mobile phone capable of operating in CDMA networks and UMANs. As mentioned below, the communication interface of a dual mode mobile station, for example, may include a dual mode wireless radio transceiver or separate radio transceivers for operating in cellular radio networks and UMANs.

As shown in FIG. 1, the mobile station 12 of the present invention is capable of communicating with the core network 14 via either a cellular radio access network, such as a CDMA radio access network 16, or a UMAN 18. In this regard, a CDMA radio access network is shown for purposes of illustration but not of limitation and generally includes a plurality of base transceiver stations 20 for directly communicating with the mobile station. The base transceiver stations also communicate with the base station controller 22 via a private network 24. The base station controller, in turn, communicates with the core network which may include the home network 26 of the mobile station as shown in FIG. 2 as well as one or more visited networks 28 as shown in FIG. 3. Thus, the mobile station can communicate with the core network via the cellular radio access network in a conventional manner known to those skilled in the art.

According to the present invention, the mobile station 12 can also communicate with the core network 14 via a UMAN 18. As shown in FIG. 1, the UMAN generally includes an access point 20, such as an unlicensed mobile access (UMA) transceiver. The access point communicates with an unlicensed network controller 32 via a broadband IP network 34. The unlicensed network controller, in turn, communicates with the core network which again may include home and visited networks 26, 28 as described below in conjunction with FIGS. 2 and 3. Typical examples of UMANs include Bluetooth™ networks, wireless local area networks (WLANs) such as WLANs defined by the IEEE 802.11 standard, WiMAX networks defined by the IEEE 802.16 standard or other wireless networks operating by frequencies that lie within unlicensed spectrums, i.e., outside of the spectrums licensed by the Federal Communications Commission (FCC).

As shown in FIGS. 2 and 3, the communication between the unlicensed network controller 32 and the core network 14 generally involves communication between the unlicensed network controller and the home network 26 of the mobile station, either directly as shown in FIG. 2 or indirectly via a visited network 28 as shown in FIG. 3. In either embodiment, the unlicensed network controller communicates with the mobile switching center (MSC) 36 of the home or visited network. The MSC is capable of routing calls to and from the mobile station 12 when the mobile station is making and receiving calls. The MSC can also provide a connection to landline trunks when the mobile station is involved in a call. In addition, the MSC can be capable of controlling the forwarding and messages to and from the mobile station. The home or visited network may also include a packet data serving node (PDSN) 38 for communicating with the unlicensed network controller and for providing access to the Internet, Intranets and application servers.

In instances in which the unlicensed network controller 32 is directly communicating with the home network 26, the unlicensed network controller and, more typically, a secure gateway (SGW) 40 of the unlicensed network controller communicates with an authentication, authorization and accounting (AAA) server 42 which, in turn, may access a database 44 containing the necessary data to authenticate a mobile station 12, authorize various services in conjunction with operation of the mobile station and account for the services utilized by the mobile station. As shown in FIG. 3 in which the unlicensed network controller is communicating directly with a visited network 28, such as in instances in which the mobile station is roaming, the secure gateway of the unlicensed network controller communicates with a AAA proxy 46 of the visited network which, in turn, communicates with the AAA server of the home network and its affiliated database in order to provide the necessary authentication, authorization and accounting services for the mobile station.

In order to facilitate handoff of communication with the mobile station 12 from a cellular radio access network, such as a CDMA radio access network 16, to the UMAN 18, the UMAN must be identifiable to the cellular radio access network. Various techniques for identifying a UMAN may be utilized although two different techniques are described below. In one embodiment, a UMAN is identified by a pilot pseudo noise (PN) offset that is otherwise unused within the cellular network. In this regard, a pilot signal identifies a cell in a cellular network, such as a CDMA network. Neighboring cells may therefore be differentiated by having different pilot PN offsets. There are generally 512 different pilot PN offset values. Since most CDMA networks do not utilize all of the pilot PN offset values, and a pilot PN offset that is otherwise unused by the CDMA network may be assigned to the UMAN. The pilot PN offset may be assigned by a system operator, such as upon construction of the UMAN or during the initial configuration of the network including both the base station controller and the unlicensed network controller. The pilot PN offset that identifies the unlicensed network controller is also associated with the cell global identifier (CGI) that denotes the coverage of an unlicensed network controller 32. Upon construction of the UMAN or otherwise during the initial configuration process, the cellular radio access networks and, more typically, the base station controllers 22 of the cellular radio access networks are provided with both the CGI and the pilot PN offset assigned to a respective UMAN and this association is stored by the network operator in the base station controllers.

In order to prompt the handoff of communications from a cellular radio access network, such as a CDMA radio access network 16, to a UMAN 18, the mobile station 12 is configured to have a preference for communication via a UMAN if a UMAN is available. The establishment of a preference for a UMAN is conventional in regards to mobile stations adapted to communicate via UMANs and will therefore not be further described herein. In this instance, upon the detection of a UMAN by the mobile station in a conventional manner, the mobile station proceeds to register with the UMAN. During the registration process, the UMAN and, more typically, the unlicensed network controller 32 provide information to the mobile station relating to the UMAN. In this regard, the UMAN generally provides the mobile station with the pilot PN offset that has been assigned to the UMAN. Once the mobile station has detected a UMAN and successfully registered with the UMAN, a predefined signaling sequence, such as that set forth by FIG. 4, may be conducted in order to effect the handoff of communications from the cellular radio access network to the UMAN.

In this regard, the mobile station 12 of this embodiment initially sends a pilot measurement message (PSMM) containing the pilot PN offset assigned to the UMAN 18. As used herein, the pilot measurement message includes one or more of a pilot strength measurement message, an extended pilot strength measurement message, a pilot strength mini message or other comparable pilot measurement messages. As known to those skilled in the art, these messages inform the base station controller 22 of a cellular radio access network, such as a CDMA radio access network 16, of the different pilot strengths for the various cells observed by the mobile station and identified by pilot PN offsets. While the pilot PN offset could be provided directly, a pilot measurement message generally identifies the various cells including the UMAN by respective pilot PN phases from which the base station controller 22 can determine the respective pilot PN offsets. In this regard, pilot PN phase may be related to pilot PN offset as follows:

$$\text{Pilot } PN \text{ Phase} = [\text{Pilot Arrival} + (64 \times \text{Pilot } PN \text{ Offset})] \text{ MOD } 2^{15}$$

wherein Pilot Arrival is zero for the UMAN.

In order to effect a handoff in accordance with this embodiment of the present invention, the mobile station 12 associates the highest signal level, i.e., the largest PN value, with the pilot PN offset that is assigned to the UMAN 18. Based upon the pilot measurement message and conventional handoff algorithms, the base station controller 22 determines that the communications session is to be handed over to the UMAN and identifies the UMAN based upon the association of the pilot PN offset to the CGI of the UMAN. The base station controller then sends a Handoff Required message to the core network 14 that identifies the target cell, i.e., the UMAN so as to initiate an intra-frequency hard handoff. Typically, the UMAN is identified to the core network by means of its CGI.

As shown in FIG. 4, the core network 14 then transmits a Handoff Request message to the unlicensed network controller 32 requesting the unlicensed network controller to allocate the necessary resources for the handover. The unlicensed network controller then acknowledges the Handoff Request message by means of a Handoff Request Acknowledge message indicating that the unlicensed network controller can support the requested handover. The unlicensed network controller also provides a handoff command that indicates the radio channel to which the mobile station 12 should be directed. The core network, in turn, forwards the Handoff Command to the base station controller, thereby completing preparation for the handoff to the UMAN 18.

The base station controller 22 next sends a Handoff Command message, such as general handoff direction message/ universal handoff direction message (GHDM/UHDM) to the mobile station 12 so as to initiate handoff to the UMAN 18. The GHDM/UHDM includes the target active set which, in this instance, includes only the pilot PN offset assigned to the UMAN. While the GHDM/UHDM initiates a handover to the UMAN, the mobile station does not switch its audio path from the base station controller to the UMAN until handover completion, i.e., until the mobile station transmits the URR Handover Complete message, to keep any audio interruption short. A mobile station may acknowledge reception of the GHDM/UHDM and the base station controller may then transmit a Handoff Commenced message to the core network 14 indicating the initiation of hard handoff. The Handoff Commenced message indicates to the core network that the mobile station has successfully received the handoff command message. The mobile station then accesses the unlicensed network controller 32 by means of a URR Handover Access message.

The unlicensed network controller 32 of this embodiment then sets up the bearer path with the mobile station 12 as indicated generally by the signals denoted URR RTP Stream Setup in FIG. 4. In this regard, the unlicensed network controller may transmit a URR activate channel message to the mobile station that includes bearer path setup information such as channel coding, the user datagram protocol (UDP) port and the IP address for the uplink stream, the voice sample size, the cipher mode for use in case of a subsequent handover to a cellular radio access network and multi-rate information if an adaptive multi-rate (AMR) codec is utilized. The mobile station then establishes the real time protocol (RTP) path to the unlicensed network controller although the mobile station has not yet connected the calling party to the audio path. The mobile station then sends a URR activate channel acknowledge message to the unlicensed network controller indicating the UDP port and IP address for the downlink stream. The unlicensed network controller then establishes the downlink RTP path with the mobile station such that the unlicensed network controller may begin transmitting idle RTP/UDP packets to the mobile station. Finally, the unlicensed network controller signals the completion of the bearer path to the mobile station with a URR activate channel complete message such that an end-to-end audio path now exists between the mobile station and the core network and the mobile station can now connect the calling party to this audio path.

Following completion of the URR RTP stream setup, the mobile station 12 may transmit a URR Handover Complete message to indicate the completion of the handover procedure at its end while concurrently switching the user from the base station controller user plane to the UMAN user plane. Thereafter, the unlicensed network controller 32 transmits a Handover Complete message to the core network 14 indicating that the unlicensed network controller has detected a mobile station. The core network can now switch the user plane from the CDMA radio access network 16 to the UMAN 18. Thereafter, bi-directional voice traffic may flow between the mobile station and the core network via the unlicensed network controller. The core network can then tear down the connection to the base station controller 22 by means of a Clear Command and the base station controller can confirm the release of the resources previously allocated for the communication session using the Clear Complete message.

As indicated above, the UMAN 18 and, more typically, the unlicensed network controller 32, may be differently identified which may alter to some degree the sequence of signals transmitted between the mobile station 12, the unlicensed network controller, the base station controller 22 and the core network 14 in order to effect handoff of communications from the cellular radio access network 16 to the UMAN. In this regard, identification of the UMAN by means of a pilot PN offset is beneficial in that there is no impact upon the signaling between the cellular network and the UMAN. However, in some rare instances, there may not be an unused pilot PN offset so the UMAN may need to be identified differently. By way of another but not the only example, the UMAN may be identified by an invalid frequency in a respective band class for the PHY layer. In this regard, various band classes are defined with each band class having a corresponding predefined frequency band. For example, band class 0 for the North American Cellular System has a mobile transmit frequency band of 824 MHz to 849 MHz and a base station transmit frequency band of 869 MHz to 894 MHz. Within each band class, a number of different frequency channels are defined with each frequency channel being identified, in some instances, by a respective CDMA frequency. According to this embodiment, the UMAN may be identified by a band class and a frequency that is invalid as a result of being outside of the predefined frequency band associated with the respective band class. For example, an unlicensed network controller may be identified in band class 0 with the frequency of 1900 MHz. Typically, a network operator assigns the band class and the frequency to the UMAN during the initial configuration of the base station controllers and the unlicensed network controller. During this initial configuration process, the network operator also typically configures the base station controllers 22 to recognize a trigger (described below) for commencing handoff to the UMAN and provides the base station controllers with the frequency that identifies the unlicensed network controller 32 of the UMAN.

As described above, in instances in which the mobile station 12 is preconfigured to prefer communications via a UMAN 18 and has successfully registered with the UMAN so as to obtain the band class and the frequency that defines the mobile station, the mobile station can trigger the handoff process upon detecting a UMAN. In this regard, the mobile station can transmit a pilot measurement message (PSMM) with the pilot strength of all the pilots being less than a predefined threshold value. In this regard, the predefined threshold value is generally defined to be less than the pilot strength of any viable cell. For example, the pilot measurement message may set the pilot strength of all of the pilots to zero or to the same small value that is less than the predefined threshold value. The base station controller 22 is preconfigured to recognize a pilot measurement message in which the pilot strengths for all of the pilot signals are less than the predefined threshold value to be a trigger for commencing an inter-frequency handoff to the UMAN. For an inter-frequency handoff, the base station controller initially transmits a Candidate Frequency Search Request message with a candidate frequency set equal to the frequency assigned to the UMAN. The mobile station then transmits a Candidate Frequency Search Response to the base station controller confirming the intent to hand off communications to the UMAN identified by the candidate frequency. The system then conducts a similar signaling sequence to that described above in conjunction with the embodiment of FIG. 4 with the exception that the GHDM/UHDM transmitted by the base station controller to the mobile station includes a target frequency set equal to the frequency assigned to the UMAN.

In contrast to the approach depicted in FIG. 4 in which the UMAN 18 was identified by a pilot PN offset, the identification of a UMAN by means of a band class and an invalid frequency is beneficial in that there will always be invalid frequencies to assign to a UMAN. However, this identification technique may also require an additional candidate frequency search step as described above.

As described above in conjunction with the embodiments of FIGS. 4 and 5, while the UMAN may be identified in various manners, the method, system 10 and mobile station 12 of the present invention permit the seamless handoff of communications from a cellular radio access network, such as a CDMA radio access network 16, to a UMAN 18. As such, a mobile station may enjoy the advantages offered by a UMAN, such as faster service and lower costs, in instances in which the mobile station has previously been communicating with a core network 14 via a cellular radio access network, but has now moved into the coverage area of the UMAN.

In order to support the handoff from a cellular radio access network, such as a CDMA radio access network 16, to a UMAN 18, the mobile station 12 of one aspect of the present invention includes a memory for storing an identification of the unlicensed network controller 32 of the UMAN and a controller for registering the mobile station with the UMAN and for thereafter communicating with the cellular radio access network to direct a handoff of communications from the cellular radio access network to the UMAN. As described above, the identification of the unlicensed network controller may take various forms, such as a pilot PN offset that is not otherwise utilized by a cellular network or a frequency that is outside of, and therefore invalid relative to, a respective band class. By way of further example, a mobile station according to one embodiment of the present invention is depicted in FIG. 6. It should be understood, however, that the mobile station illustrated and hereinafter described is merely illustrative of one type of mobile station that would benefit from the present invention and, therefore, should not be taken to limit the scope of the present invention.

As shown, in addition to an antenna 47, the mobile station 12 can include a transmitter 48, receiver 50, and controller 52 or other processor that provides signals to and receives signals from the transmitter and receiver, respectively. These signals include the signals described above in conjunction with FIGS. 4 and 5 as well as signaling information in accordance with the air interface standard of the applicable cellular system, and also user speech and/or user generated data. In this regard, the mobile station can be capable of operating with one or more air interface standards, communication protocols, modulation types, and access types. As described above, the mobile station is dual mode and is therefore generally capable of operating in accordance with both cellular radio protocols, such as CDMA protocols, including, for example, those defined by IS-95, CDMA 2000 or the like, and the wireless communications protocols supported by a UMAN, such as Bluetooth™, WLAN, WiMAX or like technologies.

It is understood that the controller 52 includes the circuitry required for implementing the audio and logic functions of the mobile station 12. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 52a, and may include an internal data modem (DM) 52b. Further, the controller may include the functionality to operate one or more software programs, which may be stored in memory (described below). For example, the controller may be capable of operating a software program capable of directing the signaling sequence set forth in FIGS. 4 and 5 to effect a hand off from a cellular radio access network, such as a CDMA radio access network 16, to a UMAN 18.

The mobile station 12 also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad includes the conventional numeric (0-9) and related keys (#, *), and other keys used for operating the mobile station. Although not shown, the mobile station can include a battery for powering the various circuits that are required to operate the mobile station.

The mobile station 12 can also include one or more means for sharing and/or obtaining data. For example, the mobile station can include a short-range radio frequency (RF) transceiver or interrogator 66 so that data can be shared with and/or obtained from electronic devices in accordance with RF techniques. The mobile station can additionally, or alternatively, include other short-range transceivers, such as, for example an infrared (IR) transceiver 68, a Bluetooth (BT) transceiver 70 operating using Bluetooth brand wireless technology developed by the Bluetooth Special Interest Group and/or a WLAN transceiver 72 for communicating in accordance with one or more wireless networking techniques, including WLAN techniques such as IEEE 802.11, WiMAX techniques such as IEEE 802.16 or the like. The mobile station can therefore additionally or alternatively be capable of transmitting data to and/or receiving data from electronic devices in accordance with such techniques.

The mobile station 12 can further include memory, such as a removable user identity module (R-UIM) or the like, which typically stores information elements related to a mobile subscriber. In addition, the mobile station can include other removable and/or fixed memory. In this regard, the mobile station can include volatile memory 76, such as volatile Random Access Memory (RAM) including a cache area for the temporary storage of data. The mobile station can also include other non-volatile memory 78, which can be embedded and/or may be removable. The non-volatile memory can additionally or alternatively comprise an EEPROM, flash memory or the like. The memories can store any of a number of software applications, instructions (including those for conducting the hand off signaling sequences of FIGS. 4 and 5 and the like), pieces of information, and data, used by the mobile station to implement its functions. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the mobile station. In addition, the memories can store the identification of the UMAN 18 and, more typically, the unlicensed network controller 32.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising: registering a mobile station with an unlicensed mobile access network (UMAN); receiving an identification of an unlicensed network controller of the UMAN at the mobile station; the identification of the unlicensed network controller comprises identifying a band class of a cellular system; identifying a frequency outside of a frequency range corresponding to the band class that is assigned to the unlicensed network controller; and transmitting a message from the mobile station to a cellular radio access network directing a handoff of communications from the cellular radio access network to the UMAN such that the mobile station is thereafter in communication with the unlicensed network controller of the UMAN.

2. A method according to claim 1 wherein directing the handoff of communications comprises transmitting pilot strengths for a plurality of pilot pseudo noise (PN) offsets that are less than a predefined value.

3. A method according to claim 2 further comprising transmitting a message including the frequency assigned to the unlicensed network controller to the mobile station.

4. An apparatus comprising: a controller configured to: register the apparatus with an unlicensed mobile access network (UMAN); obtain an identification of an unlicensed network controller of the UMAN, the identification of the unlicensed network controller comprises identifying a band class of a cellular system and identifying a frequency outside of a frequency range corresponding to the band class that is assigned to the unlicensed network controller; and a transmitter configured to transmit a message to a cellular radio access network directing a handoff of communications from the cellular radio access network to the UMAN such that the apparatus is thereafter in communication with the unlicensed network controller of the UMAN following handoff of communications from the cellular radio access network to the UMAN.

5. The apparatus according to claim 4, wherein said controller is configured to transmit a message to the cellular radio access network that defines pilot strengths for a plurality of pilot pseudo noise (PN) offsets to be less than a predefined value in order to direct the handoff of communications to the UMAN.

6. The apparatus according to claim 4, wherein the controller is further configured to receive a message from the cellular radio access network including the frequency assigned to the unlicensed network controller.

7. A method according to claim 1, wherein the band class identifies a system and comprises a predefined frequency band corresponding to the frequency range.

8. An apparatus according to claim 4, wherein the band class identifies a system and comprises a predefined frequency band corresponding to the frequency range.

* * * * *